March 17, 1936.  R. E. J. NORDQUIST  2,033,951
VACUUM MACHINE
Filed Dec. 26, 1931  9 Sheets-Sheet 6

INVENTOR
Ronald E. J. Nordquist
BY
John L. Carpenter
ATTORNEY

March 17, 1936.  R. E. J. NORDQUIST  2,033,951
VACUUM MACHINE
Filed Dec. 26, 1931   9 Sheets—Sheet 8

INVENTOR
Ronald E. J. Nordquist
BY
John C. Carpenter
ATTORNEY

March 17, 1936.  R. E. J. NORDQUIST  2,033,951
VACUUM MACHINE
Filed Dec. 26, 1931  9 Sheets-Sheet 9

INVENTOR
Ronald E. J. Nordquist
BY
John C. Carpenter
ATTORNEY

Patented Mar. 17, 1936

2,033,951

UNITED STATES PATENT OFFICE 2,033,951

VACUUM MACHINE

Ronald E. J. Nordquist, Maplewood, N. J., assignor to American Can Company, New York, N. Y., a corporation of New Jersey Application December 26, 1931, Serial No. 583,371

16 Claims. (Cl. 113—82)

The present invention relates to a vacuum closing machine and has particular reference to one wherein certain parts are manually actuated but only in correct sequence being under the automatic control of other parts which insure the proper vacuumizing and sealing of the can and prevent incorrect operation of the manually controlled parts.

The principal object of the present invention is the provision of a semi-automatic vacuum closing machine which performs a seaming operation upon a can and cover within a vacuum seaming chamber, the operation of seaming, which is hand controlled, being prevented until the proper predetermined amount of vacuum has been established within the seaming chamber and within the can.

An important object of the invention is the provision of a vacuum chamber which is closed by hand after a can and cover have been inserted for seaming and which, following the correct seaming cycle of operations, is automatically opened to permit removal of the seamed can.

An important object of the invention is the provision of a machine of this character which requires the correct closing of the vacuum chamber and the establishment of the proper amount of vacuum before the can and cover to be seamed can be inserted within the seaming mechanism and which acts after such insertion to automatically hold the can in seaming position until the completion of the seaming operation.

A further important object of the invention is the provision of a seaming machine for sealing cans under vacuum which embodies an air valve controlling the vacuum within the seaming chamber, the position and operation of the valve being automatically shifted to effect vacuumization during the seaming operation and to shut off connection with the vacuum source and open the chamber to atmosphere after the seaming and to hold it in the latter position as long as the door to the chamber is open.

An important object of the invention is the provision of an air valve control for a machine of the character described which is automatically actuated by a closing operation of the vacuum chamber to establish communication with a source of vacuum and insure the proper vacuumization of the vacuum chamber.

Numerous other objects of the invention will be apparent as it is better understood from the following description, which, taken in connection with the accompanying drawings, discloses a preferred embodiment thereof.

Referring to the drawings.

The preferred embodiment of the present invention, as illustrated in the drawings, comprises a casing surrounding a vacuum chamber in which is located a constantly rotating chuck in alignment with a can lifting support. A seaming mechanism is also disposed within the chamber and comprises seaming rollers mounted adjacent the chuck. The chamber is closed by a hinged door manually operated which is moved into chamber closing position after a can and cover have been deposited upon the can lift support within the chamber.

Upon closing of the chamber an air valve is automatically shifted to complete communication with an equalizing chamber confined within the frame of the machine. This equalizing chamber is in constant communication with a vacuum pump and is accordingly highly evacuated throughout the operations of the machine.

Upon establishment of this communication between the vacuum seaming chamber and the equalizing chamber, air is removed from the former and from the can. The resulting vacuum condition in the vacuum chamber permits actuation of a sylphon bellows associated with the can lifting support which releases a locking attachment on the can support. The can support is then raised by depression of a foot treadle and the can is brought against the chuck into seaming position. In the event that the required degree of predetermined vacuum is not present in the vacuum chamber, the locking device actuated by the sylphon bellows remains in locking position and prevents the lifting of the can into its seaming position.

After the can has been brought into raised position and clamped between the chuck and the can support it is automatically held in seaming position until after the full seaming operation has been completed. This operation of seaming, which is done by cooperation between the rollers and the rotating chuck, is under the manual control of the operator who shifts the seaming rollers by actuation of a handle located on the outside of the vacuum chamber.

At the completion of the seaming operation and as the handle is being moved to the end of its stroke, the air valve is automatically shifted to open the vacuum chamber to atmosphere and cut off its vacuum connections. When sufficient air has entered the chamber, the door is automatically thrown open and the can support is lowered for the removal of the seamed can.

Figure 1:
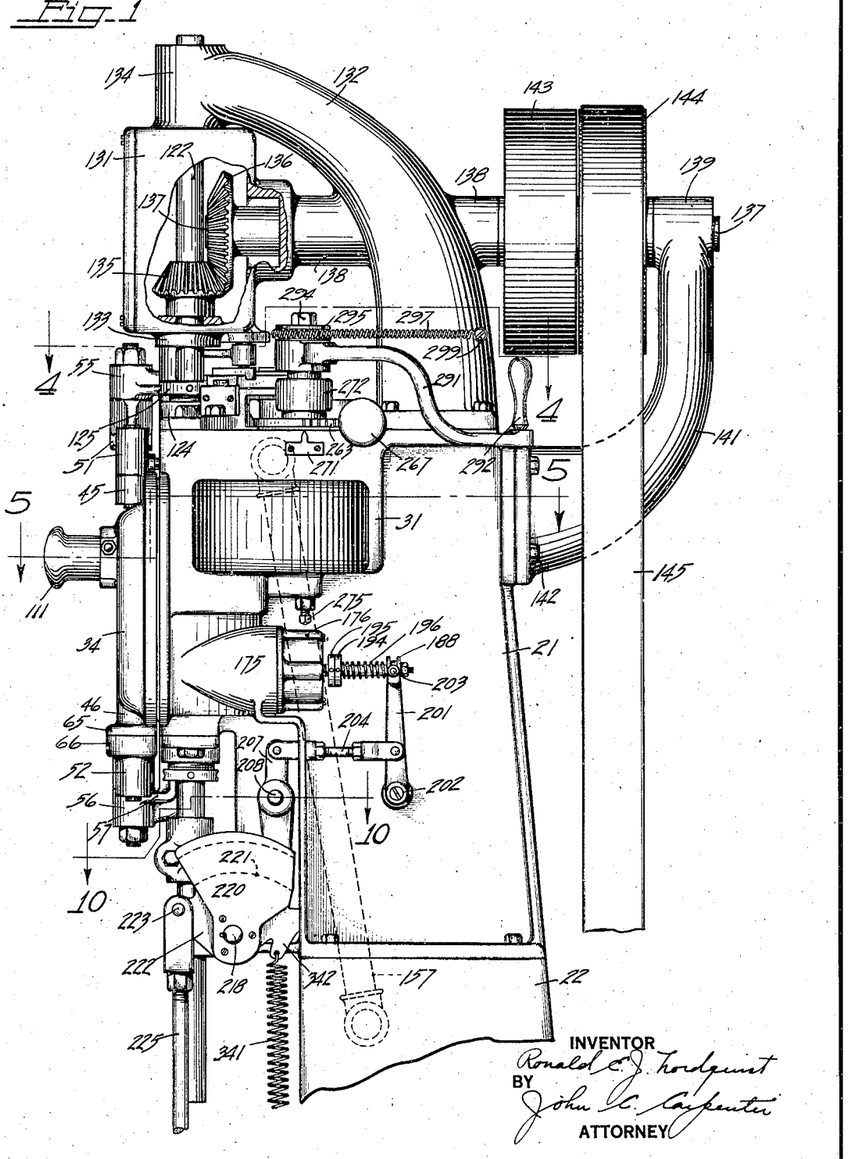
Figures 1 and 2 are side elevations of a vacuum closing machine embodying the present invention, Fig. 1 illustrating the upper part of the machine and Fig. 2 the lower part, portions of the outside wall of the machine being broken away and parts being illustrated in section.

The working parts of the apparatus are carried by an upper casing or frame 21 (Figs. 1 and 2) which is mounted upon and bolted to a lower casing or frame 22 formed integrally with a base 23 which rests upon the floor. The lower casing is preferably formed to enclose an equalizing chamber 24 which is vacuumized or exhausted of air by means of a vacuum pump 25 mounted upon a horizontal extension 26 of the casing. A passageway 27 formed in the casing wall connects the interior of the chamber 24 with a pipe 28 which leads to the intake end of the vacuum pump. A short pipe 29 is used for the exhaust.

Figure 3:
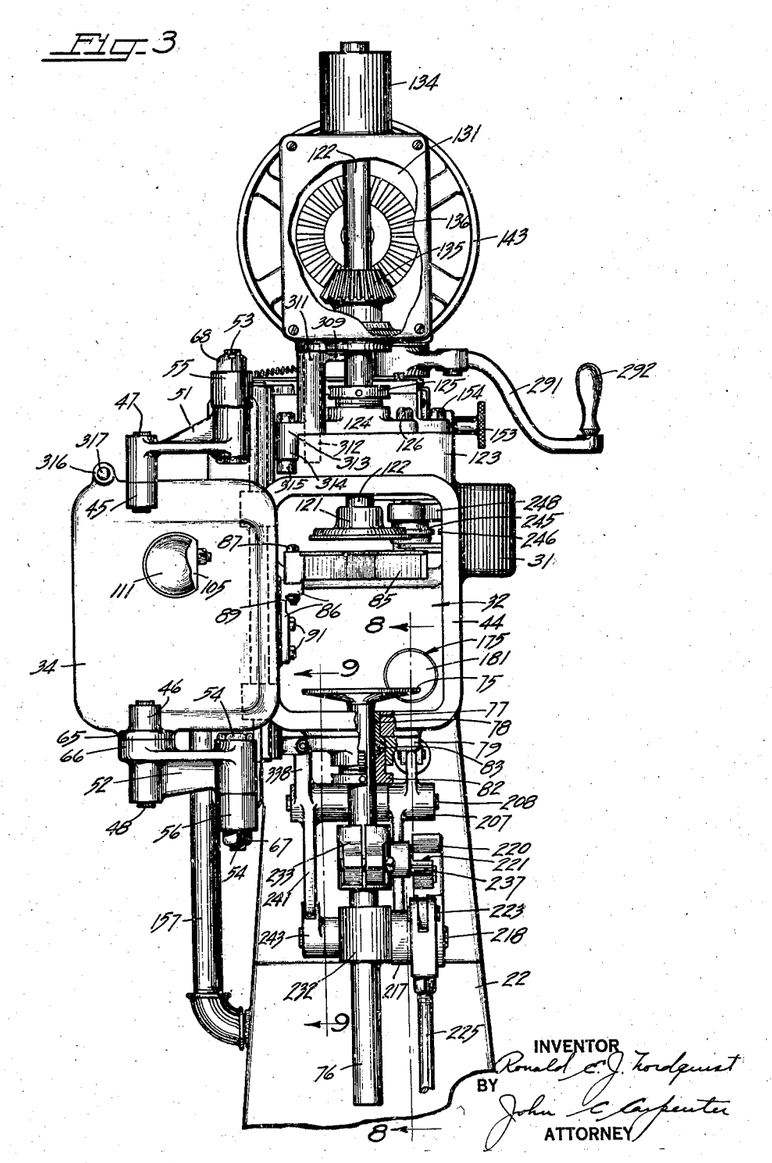
Fig. 3 is a front elevation, partly broken away, of the upper part of the machine illustrating the door of the vacuum chamber in open position.
Figure 4:
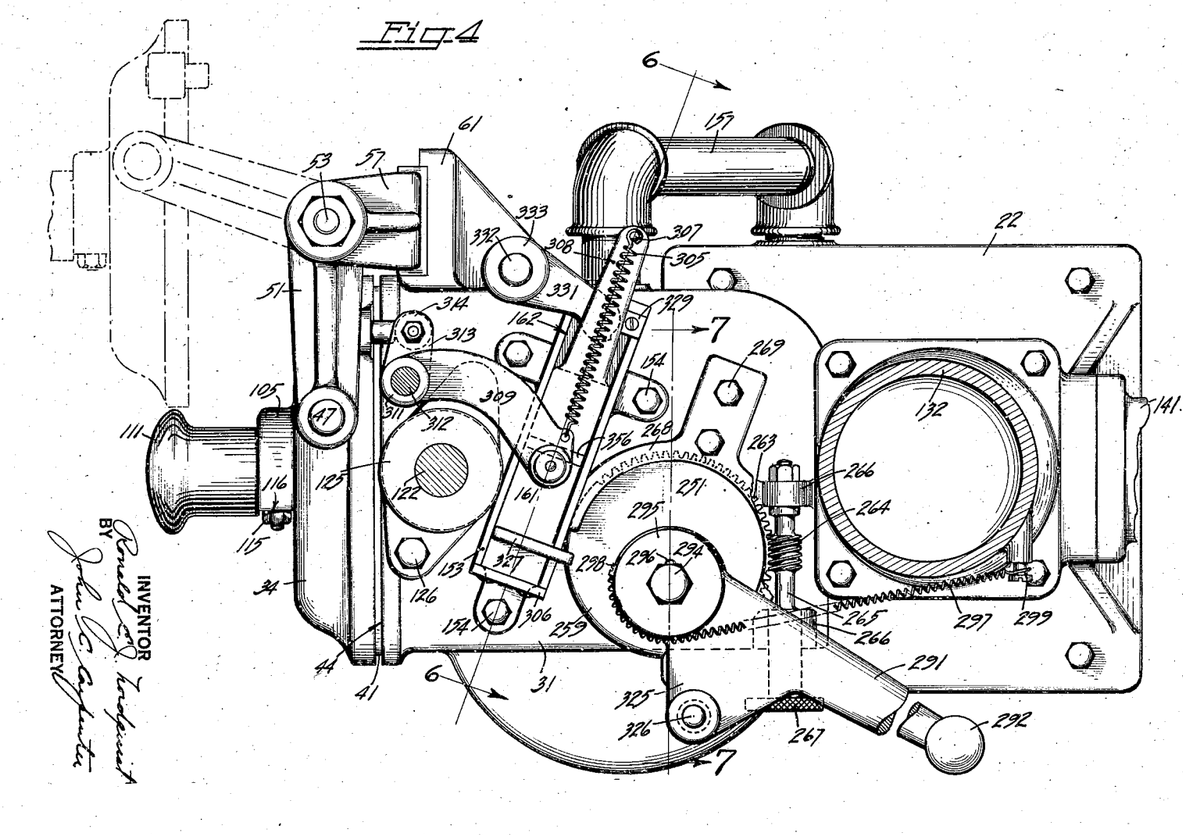
Figs. 4 and 5 are enlarged plan sectional views taken substantially along the respective broken lines 4—4 and 5—5 in Fig. 1.
Figure 5:
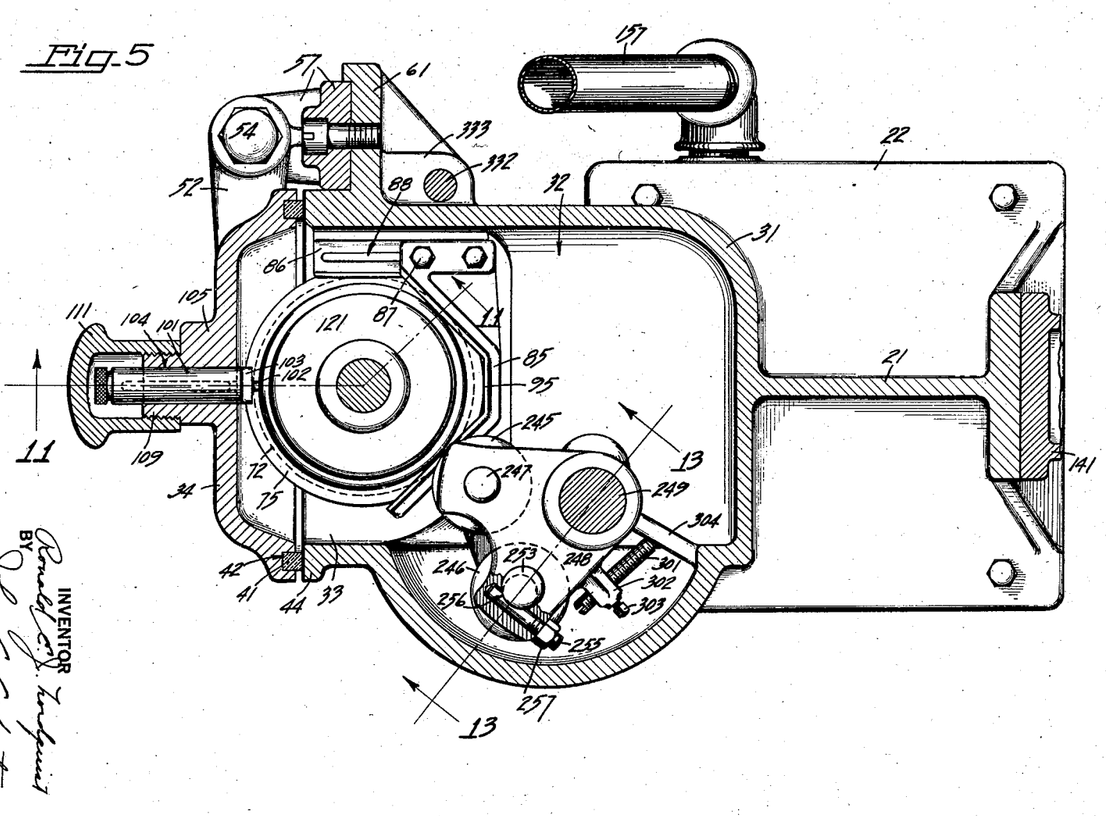

The upper casing 21 is enlarged at 31 (Figs. 3 and 5) to enclose a vacuum or sealing chamber 32 and it is in this chamber that the can and cover are sealed under vacuum. The front end of the chamber is open and provides a mouth 33 which is closed for seaming purposes by a door 34. This door is pivotally mounted to swing freely on a vertical axis and is also outwardly movable away from the mouth of the vacuum chamber. Fig. 3 illustrates the open position of the door, this position being also indicated by the broken lines in Fig. 4. The chamber closing position of the door is shown in Figs. 4 and 5. When the door is closed an annular ring gasket 41, embedded in a groove 42 formed in the inner face of the door, provides a tight seal by engaging a smooth annular flange face 44 surrounding the mouth of the chamber and formed as a part of the casing 31. The flexible and pivotal mounting of the door allows for a self-adjusting fit of the gasket member 41 against the face 44, the door being held in closed position by atmosphere as long as there is a substantial vacuum in the chamber.

This flexible mounting is obtained by a number of jointed parts which include an upper lug 45 and a lower lug 46 (Figs. 1 and 3) both formed in the outer wall of the door. These lugs provide a connection for pivot pins 47, 48 carried in swinging arms 51, 52 pivotally supported on studs 53, 54 threadedly secured into lugs 55, 56 formed in a bracket 57 (see also Figs. 4 and 5). The bracket 57 is carried in an extension 61 projecting outwardly from one wall of the casing 31.

The weight of the door 34 is directly carried by the lower lever 52, the lug 46 being enlarged at 65 to provide a solid footing which rests upon a correspondingly enlarged part 66 of the lever 52. The lever 52 in turn is rigidly supported on the stud 54, a locknut 67 being utilized for clamping the stud in solid position. In a similar way stud 53 supporting the upper lever 51, is securely clamped in its lug 55 by a locknut 68.

Figures 11, 12:
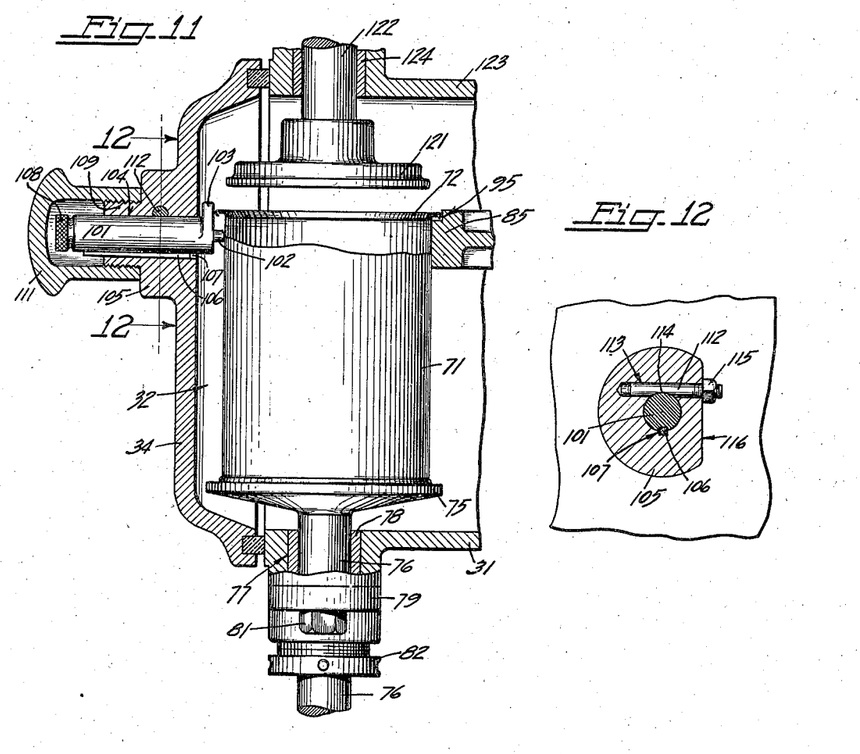
Fig. 11 is a transverse sectional view taken substantially along the broken line 11—11 in Fig. 5.
Fig. 12 is a sectional detail taken substantially along the line 12—12 in Fig. 11.

A can 71 (Fig. 11) to be vacuumized and sealed is temporarily closed with a cover 72 which loosely rests on its upper end. The door of the vacuum chamber being open the can and cover are introduced through the doorway and placed upon a can lift support 75 (see also Fig. 3) which is located within the vacuum chamber. The can support 75 is rotatably mounted on the upper end of a vertically disposed shaft 76 extending upwardly from a position outside of and beneath the vacuum chamber and with its upper end extending through an opening 77 cut in the bottom wall of the chamber casing.

A stuffing box is provided for the shaft where it enters the chamber comprising, a collar 78 disposed within the casing opening, and a stuffing box frame 79 surrounding the shaft and secured to the casing by bolts 81. This frame is internally threaded for the reception of a gland 82 which cooperates with the collar 78 to confine a packing 83. This construction prevents passage of air along the shaft but permits its free vertical movement.

As the can 71 is deposited upon the support 75, it is guided into a centralized position by a can seat 85 (Figs. 3 and 5) which is adjustably secured to a bracket 86 by bolts 87 extending through a slot 88 formed in the bracket. Locknuts 89 on the ends of the bolts clamp the can seat in fixed and adjusted position. Bolts 91 hold the bracket 86 against an inside wall of the casing 31.

The shape of the guide member 85 (Figs. 5 and 11) locates the can 71 centrally of the support 75 and a recess 95 formed in the upper inner corner of the guide insures the proper location of the can cover 72. When the door 34 is closed a gage member cooperates with the parts 85, 95 and holds the can and cover in its centralized position on the support 75.

This gage member comprises a sliding bolt 101 (Figs. 5 and 11) having an inner projection 102 for engagement with the can 71 and a lateral projection 103 for engaging the edge of the cover. This gage member is held in adjusted position within an opening 104 formed in a boss 105 of the door 34. A feather 106 (see also Fig. 12) is carried by the bolt 101 and is slid within a featherway 107 formed in the boss 105. This prevents rotation of the bolt 101.

A knurled head 108 is formed on the outer end of the gage bolt and this provides a convenient finger hold. The boss 105 is extended outwardly in a threaded shank 109 and the end of the bolt is enclosed within a hollow threaded cap 111 secured to the shank. Bolt 101 is locked in adjusted position by a locking key 112 which has slight sliding movement within a bore 113 formed in the boss 105. This key is formed with a circular recess 114 on the side adjacent the bolt 101 and the latter fits snugly in the recess. When the bolt 101 has been brought to its adjusted position the key 112 is pulled outwardly a short distance by means of a locking nut 115 threaded on its end and this brings it into clamping position. The boss 105 may be cut away at 116 to provide a seat for the locknut.

The can and cover 71, 72 in its centralized position on the support 75 is directly beneath a chuck 121 (Figs. 3, 5 and 11) of a seaming mechanism. This chuck is secured to the lower end of a vertically extending shaft 122 which projects upwardly through an opening formed in an upper wall 123 of the casing 31. A stuffing box 124 with its gland 125 is secured by bolts 126 to the casing and provides an air seal for the shaft 122 preventing loss of vacuum within the chamber 32.

The upper end of the shaft 122 (Figs. 1 and 3) extends through a gear housing 131 formed as an integral part of a bracket 132 mounted upon and secured to the upper casing 21. The shaft 122 rotates within bearings 133, 134 formed in the housing 131 and carries a gear pinion 135 located within the housing. This pinion meshes with a gear 136 keyed to the inner end of a horizontal drive shaft 137 journaled within bearings 138 formed in the bracket 132 and within a bearing 139 formed on the upper end of a bracket 141 which is secured by bolts 142 to the rear wall of the casing 21.

The drive shaft 137 is constantly rotated, during operation of the machine, in any suitable manner as by driving connection with a belt pulley 143 secured on the shaft intermediate the bearings 138, 139. The drive shaft also carries a second belt pulley 144 which is located adjacent the pulley 143 and which transmits driving power to the pump 25 (see also Fig. 2) by means of a belt 145 passing over a similar pulley 146 secured to a drive shaft 147 on the pump.

The chuck 121 is thus constantly rotated and when the can and cover are raised into engagement with the chuck for seaming they are correspondingly rotated. This raising of the can parts takes place with a lifting of the support 75 which is under the manual control of the operator. Provision is made for preventing premature raising of the support or in other words before the vacuum chamber 32 has been sufficiently vacuumized.

The degree of vacuum required for seaming will vary with the nature of the product being sealed in the can and the safety locking device for this control permits setting of the predetermined amount of vacuum which has been decided upon as the minimum degree of vacuum proper and safe for the seaming. This will now be described in detail.

Vacuumization of the chamber 32 is made by connection with the equalizing chamber 24 and for this purpose the upper casing wall 123 (Fig. 6) is formed with a vertically extending passageway 151 which communicates with a similar opening 152 formed in a valve body 153 mounted upon and secured to the casing by bolts 154. The valve body 153 is also provided with a second vertical bore or opening 155 located adjacent to but spaced a slight distance from the bore 152.

This bore 155 communicates with a passageway 156 formed in the casing wall and its lower end communicates with the upper end of a pipe 157 (see also Figs. 3, 4 and 5). The lower end of the pipe passes through an opening 158 (Fig. 2) in the side wall of the lower casing 22 and connects with the equalizing chamber 24.

An air valve 161 (Figs. 4 and 6) is mounted upon the valve body 153 and has sliding movement within a longitudinal groove 162 formed in the upper surface of the valve body 153. The under face of the valve adjacent the upper face of the valve body is cut away to provide a connecting air passage 163. When the door 34 of the vacuum chamber 32 is closed upon a can properly seated upon the support 75, the valve 161 is in the position illustrated in Fig. 6 and the passageway 163 then connects the parallel bores 152, 155. Air will now pass from the chamber 32 through the connecting passages 151, 152, 163, 155, 156, through the pipe 157 and into the equalizing chamber 24 where it is exhausted by the pump 25.

An opening 174 (Fig. 8) is cut through the rear wall of the chamber casing 31 preferably back of the support 75 and parts of the safety locking device for preventing the premature lifting of the can support are located at this position. A boss 175, formed in the rear wall of the casing, surrounds the opening 174 and a cap 176 is secured to the outer face of the boss by bolts 177. Its interior communicates with the opening 174 and provides a pocket 178 for a sylphon bellows 179.

The flexible walls of the bellows at the end adjacent the vacuum chamber connect with a movable head 181 and at the opposite end are secured to a stationary head 182. The stationary head is connected with the cap 176 by screws 183 and projects rearwardly through the end wall of the cap in a stem 184. The head 182 including its stem section is centrally apertured, a horizontal bore 186 passing throughout its length.

A rod 187 extends through the head 182 within its central bore and its inner end is threadedly engaged with the head 181. The outer end of the rod is connected with a grooved collar 188 by a nut 189 which is threaded on the rod.

The stem 184 is threaded for the reception of an adjusting nut 194 and a locknut 195. The former, in cooperation with the collar 188, confines a spring 196 which surrounds the stem and also the rod 187. The position of the nuts 194, 195 upon the stem determines the amount of compression upon the spring 196 which controls the movement of the rod 187 under actuation of the sylphon bellows. By placing a given compression on the spring a predetermined minimum degree of vacuum must be reached within the chamber 32 before the holding action of the spring 196 is overcome to effect movement of the head 181 and sliding of the rod. This will be more fully explained as the description proceeds.

The inside of the sylphon bellows 179 is filled with air at atmospheric pressure and the exterior wall of the movable head 181 of the bellows is under the same pressure as atmosphere of the interior of the chamber 32. When the chamber is vacuumized there is, therefore, a difference in pressures between the outside and the inside walls of the head 181. This pressure difference tends to cause movement of the head 181 toward the direction of least pressure, i. e. inwardly. The spring 196 being under compression tends to move the rod 187 and head 181 in the opposite direction. One movement tendency is in whole or in part counterbalanced by the other, depending upon the adjusted spring power.

Figure 8:
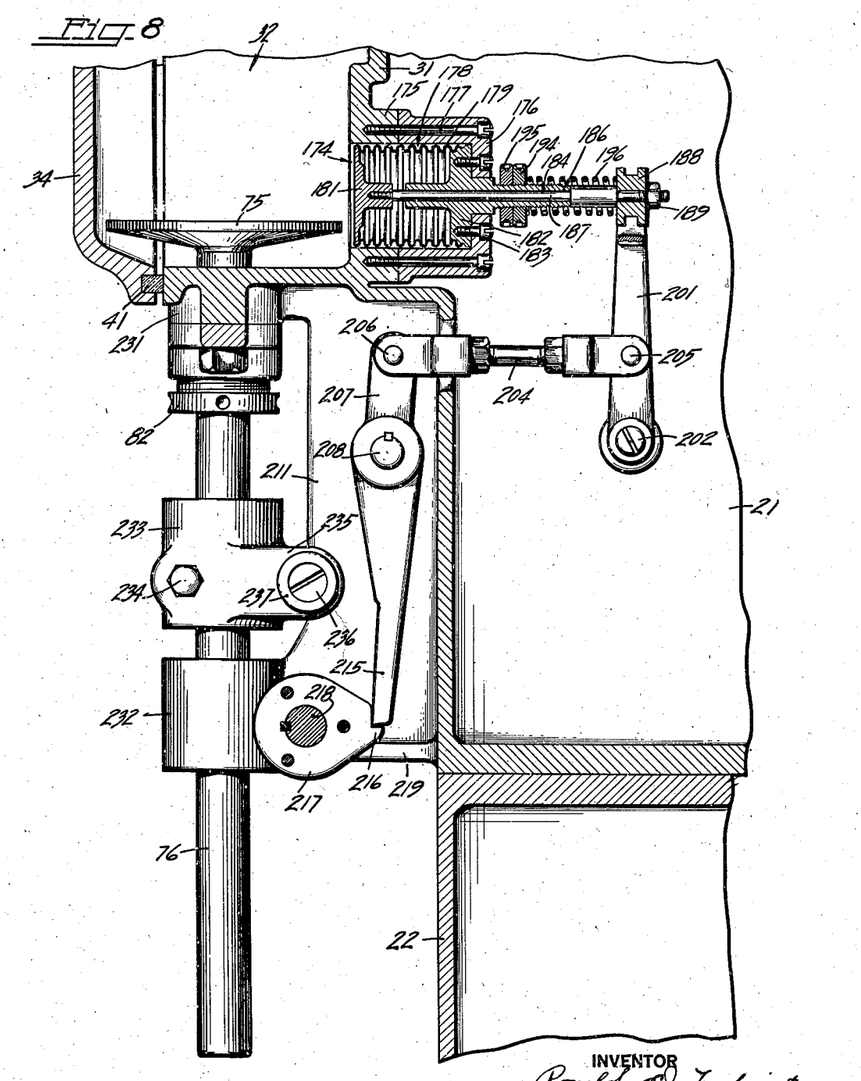
Figs. 8 and 9 are enlarged transverse sectional views taken substantially along the respective lines 8—8 and 9—9 in Fig. 3.

In practice the spring holds the head 181 outwardly as in the position shown in Fig. 8 until the predetermined minimum vacuum point has been reached within the chamber. When that condition has been established the force of the air on the inside of the bellows overcomes the combined spring pressure and the rarefied chamber pressure and head 181 and rod 187 move inwardly or toward the left as viewed in Fig. 8.

This movement of the head 181 and the rod 187 connected therewith unlocks an element of the safety locking device associated with the support 75. As long as the head 181 is in its outer position, the can support is locked against movement but as soon as the rod 187 moves inwardly the actuating elements for the support are free to move under manual operation of the operator.

This locking device associated with the sylphon bellows and with the can support comprises a lever 201 (Figs. 1 and 8) pivoted at 202 to the side of the upper casing 21. The lever 201 is yoked at its free end and pins 203 carried in the yoke project into the groove of the collar 188 and form a loose connection between lever and collar. Movement of the collar with the rod 187 imparts a corresponding movement to the lever. A link 204 is pivotally connected at 205 to the lever 201 and at 206 to the upper end of a lever 207 (see also Fig. 10).

Lever 207 is secured to a rockshaft 208 which oscillates in a bearing 209 formed in a web 211 projected forwardly of the casing 21. The lower end of the lever 207 is formed with an extension 215 which engages a stop lug 216 of a latch disc 217, when in the position shown in Fig. 8, this being the hooked position assumed prior to the vacuumizing of the chamber 32 to the predetermined vacuum point.

The latch disc 217 is keyed to a horizontal rockshaft 218 (Figs. 8, 9 and 10) which is mounted within a bearing 219 formed in the web 211. The shaft 218 also carries a cam 220 (see also Figs. 1 and 2) provided with a segmental groove 221. This cam is secured to a plate 222 which carries a pin 223 which provides pivotal connection for a connecting rod 225 pivotally connected at its lower end at 226 to a foot treadle 227 pivoted at 228 to the casing 22. This treadle carries a foot engaging tread 229.

As long as the lever 207 is in locking position with its end 215 engaging the latch 217, the shaft 218 can not be oscillated and the foot treadle 227 cannot be depressed. When the proper degree of vacuum has been established within the chamber 32 and the lever 207 has unlocked the parts 215, 216, depression of the foot treadle 227 moves the shaft 218 in a counterclockwise direction (Figs. 1 and 8) and the upper part of the cam 220 is swung forwardly.

The shaft 76 on which the can support 75 is mounted, has vertical movement within bearings 231, 232 formed in the web 211. This shaft carries a split collar 233 (see also Fig. 10) which is clamped in adjusted position by a bolt 234. This collar projects rearwardly at 235 to provide support for a stud 236 on which a cam roller 237 is rotatably mounted. The roller 237 rests at all times within the groove 221 of the cam 220 and when the latter shifts with the depressed foot treadle, the cam groove bottom wall presses against the roller 237 and forces the same upwardly. This action raises the shaft 76 and the support 75 and carries the can and cover into clamping position against the seaming chuck 121.

Figures 9, 10:
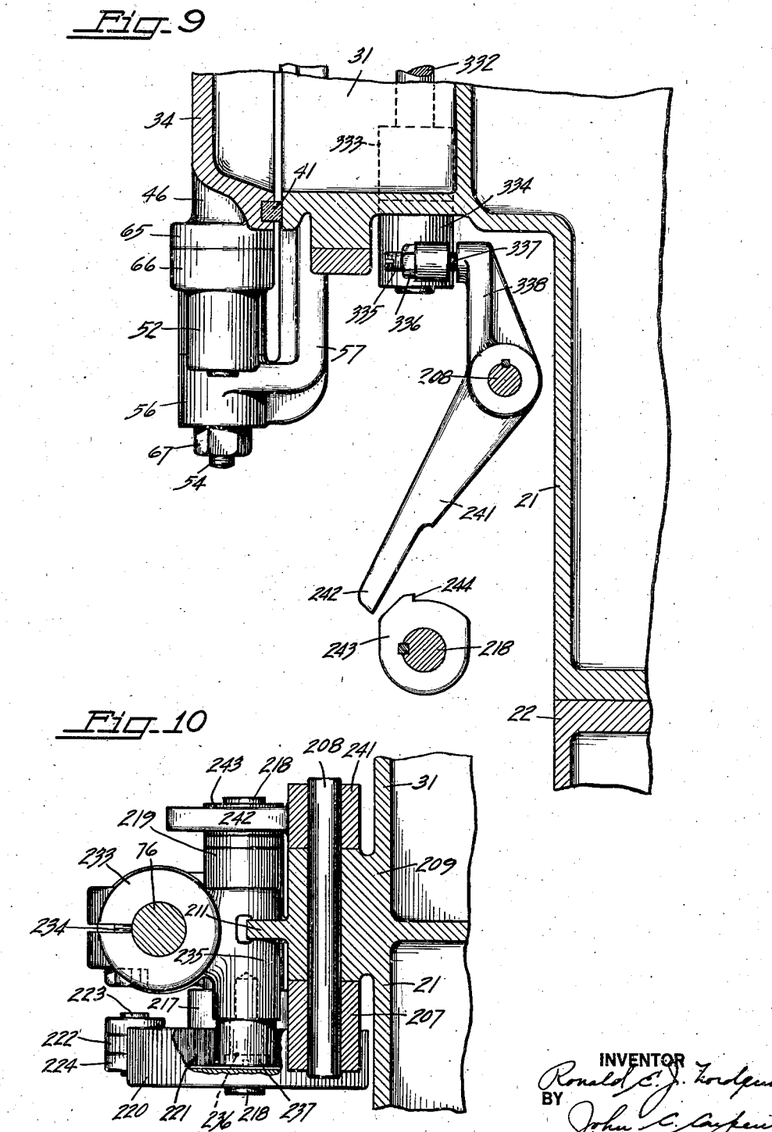
Fig. 10 is an enlarged transverse sectional detail taken substantially along the broken line 10—10 in Fig. 1.

When shaft and support have been raised, provision is made for keeping them raised and for this purpose a holding device automatically comes into play. This device prevents lowering of the can or return of the foot treadle until after the seaming operation has been completed. Figs. 9 and 10 illustrate the principal parts which comprise a locking pawl 241 keyed to the end of the rockshaft 208 opposite to that on which the lever 207 is secured.

When the shaft 208 oscillates to unlock the lever 207 and latch 217, as previously described, the locking pawl 241 moves a corresponding distance, its lower end 242 approaching the face of a cam block 243 keyed to the shaft 218. During the oscillation of the shaft 218 caused by depression of the foot treadle, the cam block 243 moves correspondingly and a projection 244 formed on the cam block 243 snaps under the end 242 of the pawl.

The can, its support and related parts, remain in raised position irrespective of the operator and his action relative to the foot treadle. This locking position with the locking pawl end 242 holding against the projection on the cam block remains until after the seaming operation has been completed. The unlatching of the locking pawl after completion of the seaming operation will be hereinafter described.

Figure 7:
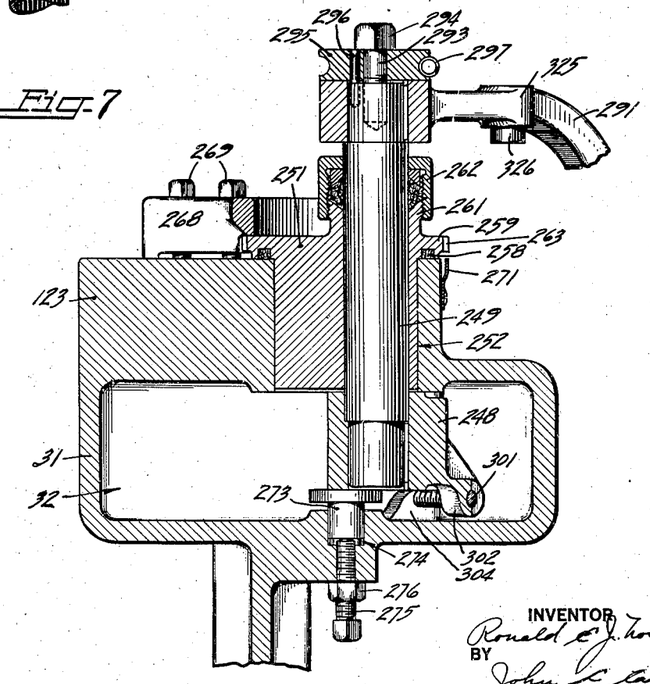
Figure 13:
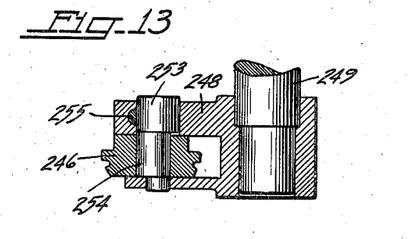
Fig. 13 is a fragmentary sectional view taken substantially along the line 13—13 in Fig. 5.

The can and cover now rotating with the rotating chuck 121 is in position for seaming and this operation is under the manual control of the operator. The seaming mechanism comprises first and second operation seaming rollers 245, 246 (Figs. 3, 5 and 13). Roller 245 is rotatably mounted upon a stud 247 which is carried in a seaming head 248 (see also Fig. 7) secured to the lower end of a seaming shaft 249 journaled in an eccentric adjusting bushing 251 mounted for oscillation in an opening 252 formed in the casing wall 123.

The second operation seaming roller 246 (Figs. 5 and 13) is mounted upon a pin 253 which is formed in three sections. The central section which supports the roller (designated by the numeral 254) is eccentric to the axis of the ends of the pin which are engaged in and carried by the seaming head 248. By turning the pin within its bearings the roller 246 may be adjusted closer to or further from the roller 245. This provides for relative adjustment between the rollers and adjustment of the seaming head 248 relative to the chuck 121 and the can seam, is effected by shifting of the eccentric bushing 251 within its seat. A locking pin 255 carried in the head 248 is used for holding the pin 253 in adjusted position. The pin 255 is cut away at 256 where it engages the roller pin and this allows for a wedging and clamping action when the pin 255 is moved longitudinally by turning it in its threaded engagement with the head. A locknut 257 may be provided.

The eccentric bushing 251 is packed outside and inside to prevent leakage of air into the vacuum chamber. An annular gasket 258 (Fig. 7) is interposed between the lower face of a toothed projecting flange 259 of the bushing 251 and the upper face of the casing wall 123. This prevents leakage of air between the bushing and the opening 252 in the casing. That part of the top of the bushing surrounding the shaft 249 is extended at 261 for the reception of a stuffing box 262. This provides for the maintenance of an air-tight seal between the shaft 249 and its bearing.

Adjustment of the bushing and the seaming head is easily made from the outside of the seaming chamber. For this purpose teeth 263 (see also Fig. 4) of the flange 259 are engaged by a worm toothed section 264 formed on a pin 265 rotatably mounted in lugs 266 projecting upwardly from the wall 123. A knurled head 267 is formed on the outer end of the pin 265 and provides a convenient finger hold for turning the pin and, through it, the bushing. A clamping plate 268 is used to hold the bushing in adjusted position. This plate is mounted on the wall 123 and overhangs the flange 259 of the bushing. Cap screws 269 hold the plate in clamping position. A marker plate 271 (see also Fig. 1) with a pointer assists in location of the bushing by gaging along the teeth 263.

The seaming head 248 is supported upon a button 273 located within a depression 274 formed in the casing wall 31. This button rests upon an adjusting screw 275 threadedly secured in the casing wall and a locknut 276 is utilized for clamping the screw in adjusted position. The desired vertical position of the seaming head is in this way obtained, such adjustment affecting the position of the seaming roller grooves relative to the can and cover flanges.

The seaming head 248 and its seaming rollers are moved through the seaming positions by oscillation of the shaft 249. This is under the control of the operator, a handle lever 291 (Figs. 1, 4 and 7) being keyed to the upper end of the shaft for this purpose. The handle lever is provided with a handle 292 which the operator grasps when ready for seaming.

A cap screw 293 is threadedly secured into the end of the shaft 249 and its head 294 clamps against a grooved collar 295 and holds it in rigid position on the handle lever. A pin 296 may be passed through the collar 295 and inserted into the end of the shaft to prevent rotation of the parts.

The handle lever is normally held in its non-operating position (Fig. 4) by a spring device which must be expanded when the operator moves the handle lever and the seamer shaft. The spring of such a device, indicated by numeral 297, is secured at one end to the collar 295 by a screw 298 and its opposite end engages a stud 299 projected outwardly from the column 132. The end of the spring adjacent the screw 298 rests within the groove of the collar and as the handle lever 291 is moved, the spring is expanded as its handle end partially wraps around the periphery of the collar 295. After the seaming operation has been completed and the handle 292 disengaged, the spring 297 insures return of the parts back into normal position.

The exact non-operating position of the handle lever 291 (Fig. 4) as held by the spring 297 is determined by a stop device carried by the seaming head 248. This comprises an adjusting screw 301 (Figs. 5 and 7) threadedly engaged in a lug 302 formed in the head. A setscrew 303 holds the screw 301 in adjusted position. The end of the adjusting screw strikes against a stop rib 304 formed in the casing wall and limits the movement of the parts 248, 249 and the handle lever 291.

Figure 6:
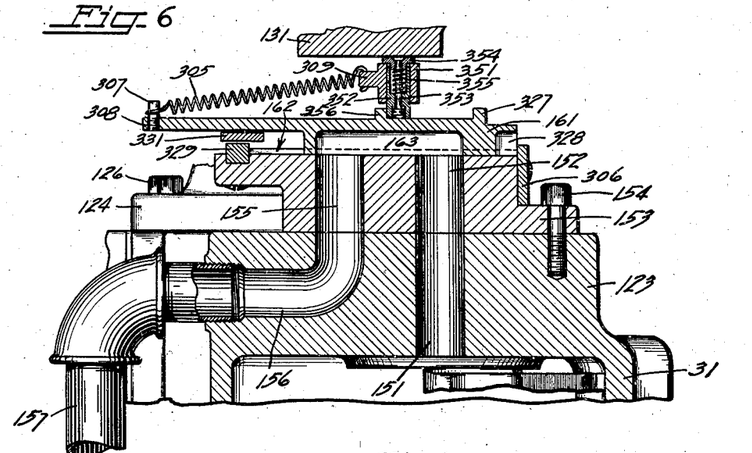
Figs. 6 and 7 are transverse sectional detail views taken substantially along the respective lines 6—6 and 7—7 in Fig. 4.

The air valve 161 (Figs. 4 and 6) is moved by the handle lever 291 to close the exhaust as the seaming operation is completed and as the handle lever approaches the end of its forward stroke. Prior to such movement and while the seaming chamber is under vacuum, the valve is in its forward position (Figs. 4 and 6).

The valve is yieldingly held in this position by a spring 305 which holds the front edge of the valve against a plate 306 fastened to the valve body 153. This spring is secured to a pin 307 carried by a tail extension 308 projecting rearwardly of the valve. The opposite end of the spring engages the free end of an arm 309 which is an integral part of a sleeve 311. The sleeve is mounted for oscillating movement on a fixed vertical shaft 312 (Fig. 3) carried in the casing head 123 its top end projecting into the bottom wall of the gear housing 131.

Sleeve 311 also has an arm 313 terminating in a boss 314 which carries a pin 315. The door 34 is provided with a projecting boss 316 (Fig. 3) in which a pin 317 is positioned. This pin 317 is so located as to be brought into engagement and to move with the pin 315 when the door is closed upon the vacuum chamber. This action rotates the sleeve 311 on the stationary shaft 312 and the arm 309 is shifted to the position illustrated in Fig. 4 which is the position of the arm 309 as long as the door 34 remains closed. This connects the exhaust with the sealing chamber as seen in Fig. 6.

Shifting of the air valve 161 to cut off the exhaust by the handle lever 291 briefly referred to in the foregoing description takes place before the door 34 is opened. The handle lever 291 (Figs. 4 and 7) is formed with a projection 325 which carries a pin 326 projecting downwardly. Near the end of movement of the handle lever and after the first and second seaming rollers have successively performed their work on the seam of the can and cover, the pin 326 strikes against a projection 327 (see also Fig. 6) formed on the air valve and valve and handle move together. This is against the yielding action of the spring 305.

The passageway 163 in the valve moves beyond and out of communication with the opening 152 in the valve body 153 and cuts off connection with the equalizing chamber 24. At the same time a channel 328, formed in the front end of the valve moves over the open end of the opening 152 and air rushes into the vacuum chamber. This destroys the vacuum within the chamber and atmospheric pressure is substituted. The valve 161 in its extreme backward position strikes against a block 329 (Fig. 6) which is embedded in the valve body 153.

As the air pressure on the outside and on the inside of the door 34 becomes equalized, the outside atmosphere ceases to hold the door in closed position and the spring 305 being under tension quickly moves the arm 309 on the shaft 312 and forces the arm 313 outwardly. The pin 315 pushing against the door pin 317 partially opens the door by swinging it on its hinges. The door being free to move is then opened by hand the member 111 making a convenient handle for the purpose.

The unlocking of the latch device which holds the can support in its raised position takes place automatically, the moving valve 161 at the end of its travel providing the power for the purpose. The valve (Figs. 4 and 6) strikes against and moves an arm 331, which is located beneath the valve projection 308 and which is secured to the upper end of a rockshaft 332. The shaft 332 is journaled in bearings 333 (see also Figs. 5 and 9) formed in the casing 31.

The lower end of the shaft 332 carries an arm 334 in the free end of which a setscrew 335 is secured. A locknut 336 engaging the setscrew holds it in fixed adjusted position so that its forward end 337 engages an arm 338 formed as an integral part of the locking pawl 241. This movement of the shaft 332 and the corresponding shifting of the locking pawl 241 disengages its end 242 from the projection 244 on the collar 243.

Figure 2:
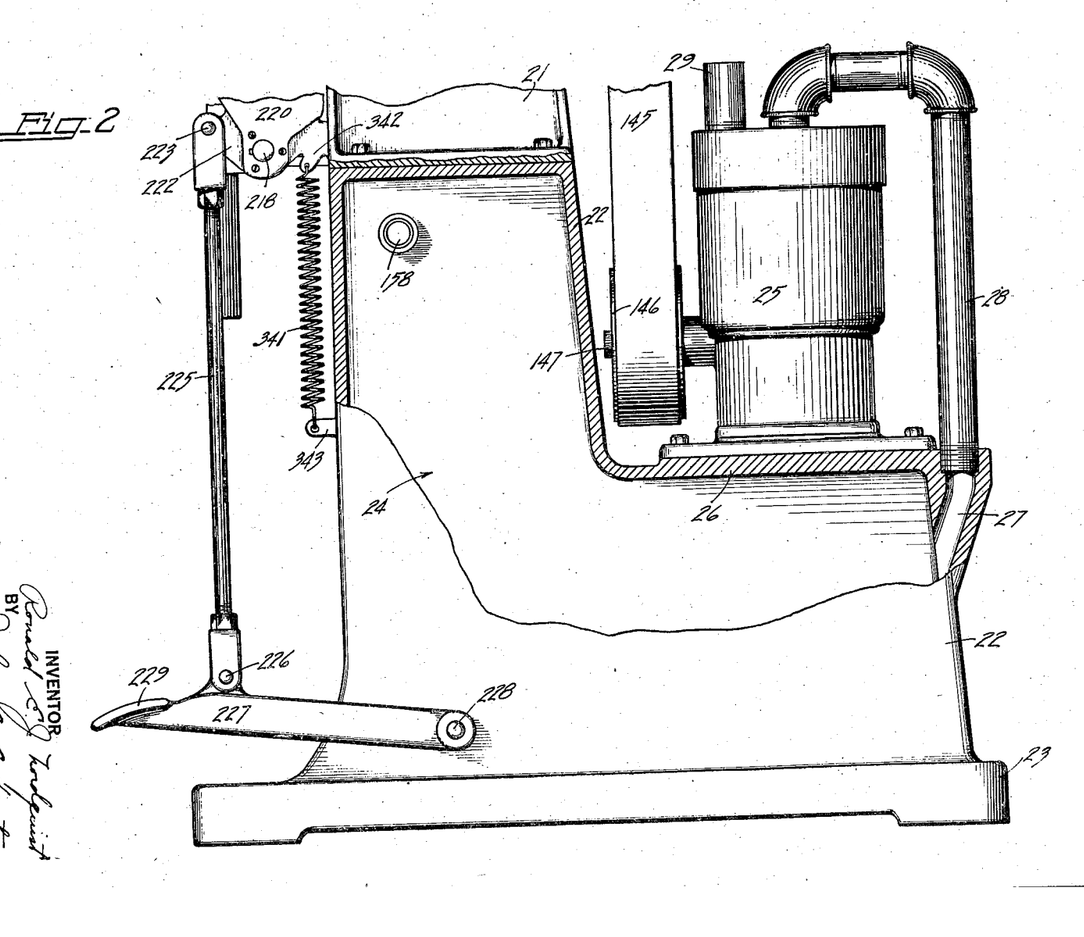

The shaft 218 is thereupon pulled back to its normal position by a spring 341 (Fig. 2) which is secured at one end to a lug 342 formed on the plate 222. This plate strikes against the casing 21 as shown in Fig. 2 and this limits the movement of the shaft 218 as rotated by the spring 341. The opposite end of the spring 341 is secured to a fixed post 343 formed in the casing 22. The seamed can, which was lowered with the can support 75, is now free from the seaming chuck 121 and may be removed from the seaming chamber.

As long as the door 34 is open, there is no working tension upon the spring 305 (Figs. 4 and 6). This will now be explained. The free end of the arm 309 is formed as a boss 351 and a bushing 352 is held in the boss by a pin 353. This pin extends through the bushing and is fastened at its end into a button 354 positioned on top of the boss and frictionally engaging the under wall of the gear housing 131. The bushing 352 is forced downwardly by an enclosed spring 355 which forces its lower end into frictional engagement upon the upper face of the valve 161.

A projection 356 is formed in the upper side of the valve and is spaced a short distance from the projection 327. As long as the door is open the bushing 352 is held against the projection 356 by the spring 305 and even though the spring is under tension it cannot move the arm 309 relative to the valve. In other words it is under non-working tension.

The valve 161 remains in its backward position against the stop 329 as long as the door is open and with the passageway 328 in communication with the opening 152 and the exhaust passage 155 is closed. Normally the handle lever 291 is immediately released upon completion of its forward stroke and is returned to normal position by the spring 297 as previously described. This return movement of the handle lever at that time or later does not effect the position of the valve. Closing of the door for a seaming cycle indirectly moves the valve by reason of the oscillation of the sleeve 311 with its arms 309, 313 which action first forces the bushing 352 back and away from the projection 356 and this puts a working strain on the spring 305. This spring tension then causes the slide valve to be pulled forward and it moves along its guideway until its front end is brought into engagement with the plate 306.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for vacuumizing and sealing containers, the combination of a casing enclosing a vacuum chamber adapted to be brought under a predetermined vacuum, a rotatable container-lifter and can-rotating chuck and seaming mechanism in said chamber, means for closing said chamber after insertion of a can and cover to be seamed, actuating devices for said seaming mechanism manually operable from the outside of said casing, and means operated by said actuating devices and effective at the termination of the seaming operation for breaking the vacuum in said chamber and opening it for removal of said seamed can.

2. In an apparatus for vacuumizing and sealing containers, the combination of a casing enclosing a vacuum chamber adapted to be brought under a predetermined vacuum, can-rotating means and seaming mechanism in said chamber, means for closing said chamber after insertion of a can and cover to be seamed, instrumentalities for raising the can and cover into seaming position within said seaming mechanism, and safety means controlled by the vacuum in said chamber, devices connected with said safety means and can raising instrumentalities for preventing the raising of the can into seaming position in the event that the vacuum in said chamber is less than the desired predetermined degree of vacuum.

3. In an apparatus for vacuumizing and sealing containers, the combination of a casing enclosing a vacuum chamber adapted to be brought under a predetermined vacuum, seaming mechanism in said chamber, means for closing said chamber after insertion of a can and cover to be seamed, instrumentalities including a foot treadle for raising the can and cover into seaming position within said seaming mechanism, and safety means controlled by the vacuum in said chamber for locking said foot treadle against movement and thereby preventing operation of said instrumentalities and the raising of the can into seaming position in the event that the vacuum in said chamber is less than the desired predetermined degree of vacuum.

4. An apparatus for vacuumizing and sealing containers, comprising in combination, a vacuum chamber having a fixed bottom and a door in the side thereof, seaming mechanism in said chamber, can-rotating means and means for closing said chamber after insertion of a can and cover to be seamed, means including a foot control operable exterior of said chamber for bringing the can and cover into seaming position within said seaming mechanism, and means for holding said can and cover in seaming position irrespective of the continued actuation of said foot control.

5. An apparatus for vacuumizing and sealing containers, comprising in combination, a vacuum chamber, can-rotating means and seaming mechanism in said chamber, means for closing said chamber after insertion of a can and cover to be seamed, means including a foot control operable exterior of said chamber for bringing the can and cover into seaming position within said seaming mechanism, actuating devices for said seaming mechanism operable exterior of said chamber for effecting the seaming of the can and its cover by said seaming mechanism, and means independent of the continued actuation of said foot control for holding said can and cover in seaming position throughout the seaming cycle.

6. An apparatus for vacuumizing and sealing containers, comprising in combination, a vacuum chamber, seaming mechanism in said chamber, means for closing said chamber after insertion of a can and cover to be seamed, actuating devices for effecting the seaming of the can and its cover by said seaming mechanism, a slide valve controlled by said actuating devices and effective at the termination of the seaming operation for breaking the vacuum in said chamber, means associated with said valve for opening said chamber after its vacuum has been broken, means for holding said valve in vacuum breaking position while said chamber is open, and restoring means operated by the closing of said chamber for returning said valve to position to bring said chamber under vacuum.

7. An apparatus for vacuumizing and sealing containers, comprising in combination, a casing enclosing a vacuum seaming chamber and a vacuum equalizing chamber, a seaming mechanism in said seaming chamber for hermetically sealing a cover on a can, means for closing said seaming chamber before the seaming operation, means for vacuumizing said equalizing chamber, and means including a slide valve for connecting said chambers when said seaming chamber is closed for said can and cover sealing, said means also breaking the connection between said chambers and connecting the seaming chamber with atmosphere after said sealing has been completed.

8. In an apparatus for vacuumizing and sealing containers, the combination of a casing enclosing a vacuum chamber adapted to be brought under a predetermined vacuum, seaming mechanism in said chamber, means for closing said chamber after insertion of a can and cover to be seamed, actuating devices for said seaming mechanism manually operable from the outside of said casing, and means sensitive to vacuum the sensitive element of which is arranged within the walls of said chamber for preventing the seaming of can and cover without the proper degree of said predetermined vacuum in said chamber.

9. In an apparatus for vacuumizing and sealing containers, the combination of a casing enclosing a vacuum chamber adapted to be brought under a predetermined vacuum, seaming mechanism in said chamber, means for closing said chamber after insertion of a can and cover to be seamed, actuating devices for said seaming mechanism manually operable from the outside of said casing, means sensitive to vacuum the sensitive element of which is arranged within the walls of said chamber for preventing the seaming of can and cover without the proper degree of said predetermined vacuum in said chamber, and adjusting devices for altering the said predetermined vacuum point.

10. In an apparatus for vacuumizing and sealing containers, the combination of a casing enclosing a vacuum chamber adapted to be brought under a predetermined vacuum, seaming mechanism in said chamber, means for closing said chamber after insertion of a can and cover to be seamed, adjustable gage members associated with said chamber closing means for centering said can and cover in said chamber, actuating devices for said seaming mechanism, and means sensitive to vacuum the sensitive element of which is arranged within the walls of said chamber for insuring the predetermined degree of vacuum in said chamber prior to effecting the sealing of said can and cover.

11. An apparatus for vacuumizing and sealing containers comprising in combination, a casing enclosing a vacuum chamber, seaming mechanism including seaming elements in said chamber for sealing a cover on a can, a seaming shaft extending through said casing and supporting said seaming mechanism, actuating devices for rotating said shaft to effect the said sealing of the can by the seaming elements, and means interposed between said shaft and said casing and operable from a position exterior of said casing for bodily moving said shaft laterally to vary the relative position between said seaming elements and the said can in order to adjust the characteristics of the can and cover seam as created by said seaming mechanism.

12. An apparatus for vacuumizing and sealing containers comprising in combination, a casing enclosing a vacuum chamber, seaming mechanism including first and second operation seaming rolls in said chamber for sealing a cover on a can, a seaming shaft extending through said casing and supporting said seaming mechanism, actuating devices for rotating said shaft to effect the said sealing of the can by the seaming rolls, and means interposed between said shaft and said casing and operable from a position exterior of said casing for bodily moving said shaft laterally to vary the relative position between said seaming rolls and the said can in order to adjust the characteristics of the can and cover seam as created by said seaming mechanism, and means for adjusting the axis of rotation of one of said seaming rolls relative to the other.

13. An apparatus for vacuumizing and sealing containers, comprising the combination of a casing enclosing a vacuum-chamber, can-rotating means and seaming mechanism in said chamber, a can support in said chamber for holding a can and cover to be seamed, a door hingedly connected to said casing for admitting said can and cover to said can support when in open position and for closing said chamber when in closed position, means on said door for engaging the can cover, means for vacuumizing said chamber, and actuating means for said seaming mechanism which cooperate with said can support to effect the seaming of the can and cover, said actuating means cooperating with said vacuumizing means to establish and remove a vacuumized condition.

14. An apparatus for vacuumizing and sealing containers, comprising in combination, a vacuum chamber, can-rotating means and seaming mechanism in said chamber, an inwardly movable door for closing said chamber after insertion of a can and cover to be seamed and having means to adjust the can, actuating devices for effecting the seaming of the can and its cover by said seaming mechanism, a slide valve controlled by said actuating devices and effective at the termination of the seaming operation for breaking the vacuum in said chamber, and means associated with said valve for opening said closing means after the vacuum in said chamber has been broken.

15. An apparatus for vacuumizing and sealing containers, comprising in combination, a vacuum chamber, can-rotating means and seaming mechanism in said chamber, an inwardly movable door for closing said chamber after insertion of a can and cover to be seamed, actuating devices for effecting the seaming of the can and its cover by said seaming mechanism, a slide valve controlled by said actuating devices and effective at the termination of the seaming operation for breaking the vacuum in said chamber, means associated with said valve for opening said closing means after the vacuum in said chamber has been broken, and means for holding said valve in vacuum breaking position while said chamber is open.

16. An apparatus for vacuumizing containers comprising, in combination, a casing enclosing a vacuum chamber adapted to be brought under a predetermined vacuum, seaming mechanism in said chamber, a door to permit introducing a container into said chamber, means for closing said door and chamber after insertion of a container to be seamed, actuating devices for operating said seaming mechanism, and a vacuum-responsive bellows member disposed in said chamber, said bellows member being expansible and collapsible so as to be acted upon exteriorly by normal and rarefied and intermediate pressures, and means operated by the expansion of said bellows for preventing the seaming of a container in said chamber when the latter is not sufficiently vacuumized.

RONALD E. J. NORDQUIST.